UNITED STATES PATENT OFFICE.

FRANK BROZ, OF SAN FRANCISCO, CALIFORNIA.

COMPOUND FOR FLAVORING COFFEE.

SPECIFICATION forming part of Letters Patent No. 252,723, dated January 24, 1882.

Application filed November 29, 1881. (No specimens.)

*To all whom it may concern:*

Be it known that I, FRANK BROZ, of the city and county of San Francisco, State of California, have invented a Compound for Flavoring Coffee; and I hereby declare the following to be a full, clear, and exact description thereof.

My invention relates to a compound which I call "coffee-flavoring," and which is employed to improve the taste or flavor of coffee.

It consists of a preparation composed of figs, vanilla, and honey, which, when properly mixed, is put up in packages, and is ready for use when desired.

In the preparation of my compound I take ordinary dried figs, which form the bulk of the mass, and roast them. I then add a small quantity of vanilla, which is also roasted, and the two are mixed with honey into a moist, crumbly mass. The proportions I have found to give good results are as follows: one thousand (1,000) pounds of figs, two (2) pounds of vanilla, fifty (50) pounds of honey. The figs and vanilla having been roasted, as before described, are mixed together with the hon y, which may be diluted, if desired, and the whole mass is stirred until it is intimately mingled and has assumed the form of a moist, crumbly powder. This has, however, a consistence which enables me to put it up in packages of proper size for the market. When it is to be used I add about an ounce of the compound to a pound of coffee, which gives a flavor equal to the best Vienna coffee.

Having thus described my invention, what I claim as new, and desire to secure by Letters Patent, is—

A compound consisting of roasted figs, vanilla, and honey, united in about the proportion and for the purpose herein described.

In witness whereof I hereunto set my hand.

FRANK BROZ.

Witnesses:
   S. H. NOURSE,
   FRANK A. BROOKS.